Patented Apr. 19, 1932

1,854,787

UNITED STATES PATENT OFFICE

PAUL DUTOIT, OF LAUSANNE, SWITZERLAND, ASSIGNOR TO SOCIETE MINIERE & METALLURGIQUE DE PENARROYA, OF PARIS, FRANCE

PROCESS FOR THE MANUFACTURE OF PURIFIED ZINC SULPHATE SOLUTIONS

No Drawing. Application filed November 9, 1929, Serial No. 406,167, and in France January 30, 1929.

I have filed applications in France, January 30, 1929, Germany, March 4, 1929, and Great Britain, April 11, 1929.

This invention relates to the manufacture of purified zinc sulphate solutions.

Zinc sulphate solutions which are employed in certain industrial applications and particularly for electrolysis must be of great purity.

However, these solutions generally contain, among other impurities, cobalt.

Various means are known in the art, such as precipitation cementation and the like, in order to eliminate the cobalt from these solutions but these means do not permit of eliminating it quantitatively and traces always remain of the order of a few milligrams per litre, attempts to remove which have not succeeded up to the present time.

These traces of cobalt remaining in the solution are prejudicial to the subsequent treatment of this latter by electrolysis, for example.

In addition, the processes in question have the inconvenience of requiring an excess of reagent which renders them expensive and of always necessitating a very long period of time for the precipitation of the cobalt in a separable form.

In accordance with the present invention a substantially quantitative purification of solutions of zinc sulphate from all the cobalt and other metallic impurities which they contain is effected.

The process of manufacture of this invention consists in treating a zinc sulphate solution, containing such impurity, with a reagent having the property of taking up the metallic impurity to be eliminated (cobalt, for example,) with the formation of a compound having a large molecule or forming large particles, for example, in colloidal suspension and which, although it cannot be isolated by simple filtration or the like, can be fixed in the known manner by means of a suitable adsorbent material (active carbon, talc, kieselguhr, infusorial earth or the like).

In this manner by the introduction of the cobalt atom into a large molecule followed by an adsorbtion which fixes this large molecule it becomes possible to eliminate quantitatively the metallic impurity (cobalt, for example,) contained in the zinc sulphate solution under treatment.

The advantage of this process, whatever reagent is employed, is to reduce both the quantity of reagent necessary and the time taken up in the operation for it is not necessary to wait until the compound (in which the cobalt, for example, is combined) is precipitated in an insoluble form, but it may remain in the form of a suspension.

There can be employed for effecting the process any of the reagents commonly employed for the precipitation of cobalt from zinc solutions such as betanitrosonaphthol, potassium nitrate, alkaline sulphides and the like. In accordance with the invention there can likewise equally well be used dimethylglyoxime which is known to precipitate nickel quantitatively but not cobalt.

Instead of dimethyl glyoxime other organic oximes or phenols may be employed as reagent.

As an example, a solution of zinc sulphate containing cobalt (even of the order of 1-20 milligrams per litre) to which is added dimethyl glyoxime on treatment with an adsorbent (active carbon, for example), and filtration or centrifuging loses quantitatively the whole of its cobalt.

I claim as my invention:

1. The process of purifying zinc sulphate solutions containing metallic impurities which comprises treating said solution with dimethylglyoxime with the formation of a compound having a large molecule, adsorbing this compound on an adsorbent material and separating the adsorbent containing the adsorbed impurities.

2. The process of purifying zinc sulphate solutions containing cobalt as impurity which comprises treating said solutions with an organic oxime with the formation of a compound having a large molecule, adsorbing this compound on an adsorbent material and separating the adsorbent containing the adsorbed impurities.

3. The process of purifying zinc sulphate solutions containing cobalt as impurity which comprises treating said solutions with dimethylglyoxime with the formation of a colloidal suspension, adsorbing the colloidal particles on an adsorbent material and separating the adsorbent containing the adsorbed impurities.

4. The process of purifying zinc sulphate solutions containing cobalt as impurity which comprises treating said solutions with dimethylglyoxime with the formation of a colloidal suspension, adsorbing the colloidal particles on active charcoal and separating the charcoal containing the adsorbed impurities.

In testimony whereof I have signed this specification.

PAUL DUTOIT.